US010078803B2

(12) United States Patent
Sharifi et al.

(10) Patent No.: US 10,078,803 B2
(45) Date of Patent: Sep. 18, 2018

(54) SCREEN-ANALYSIS BASED DEVICE SECURITY

(71) Applicant: GOOGLE INC., Mountain View, CA (US)

(72) Inventors: Matthew Sharifi, Kilchberg (CH); Kai Wang, Santa Monica, CA (US); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 14/739,107

(22) Filed: Jun. 15, 2015

(65) Prior Publication Data

US 2016/0366126 A1 Dec. 15, 2016

(51) Int. Cl.
*G06N 99/00* (2010.01)
*H04L 29/06* (2006.01)
(Continued)

(52) U.S. Cl.
CPC ......... *G06N 99/005* (2013.01); *G06F 21/316* (2013.01); *G06F 21/36* (2013.01); *H04L 63/083* (2013.01); *H04W 4/02* (2013.01); *H04W 12/06* (2013.01); *H04L 63/102* (2013.01); *H04W 4/80* (2018.02); *H04W 12/10* (2013.01); *H04W 12/12* (2013.01)

(58) Field of Classification Search
None
See application file for complete search history.

(56) References Cited

U.S. PATENT DOCUMENTS 7,162,522 B2   1/2007  Adar et al.
8,352,386 B2   1/2013  Chitiveli et al.
(Continued)

FOREIGN PATENT DOCUMENTS

WO   2012075315 A1   6/2012

OTHER PUBLICATIONS

Bassu, "A New Mobile Biometric Based Upon Usage Context", 2013 IEEE International Conference on Technologies for Homeland Security (HST), Nov. 12, 2013, pp. 441-446.
(Continued)

*Primary Examiner* — Trang Doan
(74) *Attorney, Agent, or Firm* — Middleton Reutlinger

(57) ABSTRACT

Systems and methods are provided for a content-based security for computing devices. An example method includes identifying content rendered by a mobile application, the content being rendered during a session, generating feature vectors from the content and determining that the feature vectors do not match a classification model. The method also includes providing, in response to the determination that the feature vectors do not match the classification model, a challenge configured to authenticate a user of the mobile device. Another example method includes determining a computing device is located at a trusted location, capturing information from a session, the information coming from content rendered by a mobile application during the session, generating feature vectors for the session, and repeating this until a training criteria is met. The method also includes training a classification model using the feature vectors and authenticating a user of the device using the trained classification model.

18 Claims, 8 Drawing Sheets

(51) Int. Cl.
  *H04W 12/06* (2009.01)
  *G06F 21/31* (2013.01)
  *H04W 4/02* (2018.01)
  *G06F 21/36* (2013.01)
  *H04W 12/12* (2009.01)
  *H04W 12/10* (2009.01)
  *H04W 4/80* (2018.01)

(56) References Cited

U.S. PATENT DOCUMENTS

| | | | |
|---|---|---|---|
| 8,468,110 B1 | 6/2013 | Podgorny et al. | |
| 8,571,319 B2 | 10/2013 | Balasubramanian et al. | |
| 8,811,727 B2 | 8/2014 | Mohamed | |
| 8,928,587 B1* | 1/2015 | Smus | H04W 4/38 |
| | | | 345/156 |
| 8,978,111 B2* | 3/2015 | Doris-Down | H04W 12/00 |
| | | | 726/2 |
| 8,984,591 B2* | 3/2015 | McFarland | H04W 12/08 |
| | | | 726/4 |
| 9,165,406 B1 | 10/2015 | Gray et al. | |
| 9,185,095 B1* | 11/2015 | Moritz | H04L 63/102 |
| 9,405,377 B2* | 8/2016 | Li | G06F 3/017 |
| 9,582,482 B1 | 2/2017 | Sharifi et al. | |
| 9,590,966 B2* | 3/2017 | Sheller | H04L 63/08 |
| 2007/0168379 A1 | 7/2007 | Patel et al. | |
| 2008/0083040 A1* | 4/2008 | Dani | H04L 63/0807 |
| | | | 726/28 |
| 2008/0301101 A1 | 12/2008 | Baratto et al. | |
| 2009/0063431 A1 | 3/2009 | Erol et al. | |
| 2009/0328175 A1* | 12/2009 | Shuster | G06F 21/36 |
| | | | 726/7 |
| 2011/0128288 A1 | 6/2011 | Petrou et al. | |
| 2011/0131235 A1 | 6/2011 | Petrou et al. | |
| 2012/0060214 A1* | 3/2012 | Nahari | G06F 21/316 |
| | | | 726/19 |
| 2012/0083294 A1 | 4/2012 | Bray et al. | |
| 2013/0042327 A1* | 2/2013 | Chow | G06F 21/316 |
| | | | 726/28 |
| 2013/0067261 A1* | 3/2013 | Carroll | G06F 1/3203 |
| | | | 713/323 |
| 2013/0091463 A1 | 4/2013 | Nordstrom et al. | |
| 2013/0108161 A1 | 5/2013 | Carr | |
| 2013/0191908 A1* | 7/2013 | Klein | G06F 21/36 |
| | | | 726/18 |
| 2014/0109018 A1 | 4/2014 | Casey et al. | |
| 2014/0283014 A1 | 9/2014 | Tse et al. | |
| 2014/0333524 A1* | 11/2014 | Liu | G06F 3/017 |
| | | | 345/156 |
| 2014/0337243 A1* | 11/2014 | Dutt | G06Q 50/265 |
| | | | 705/325 |
| 2016/0055246 A1 | 2/2016 | Marcin et al. | |
| 2016/0182502 A1* | 6/2016 | Smith | H04L 63/0861 |
| | | | 726/7 |
| 2016/0321052 A1 | 11/2016 | Sharifi et al. | |

OTHER PUBLICATIONS

International Search Report and Written Opinion from PCT/US2016/037210, dated Aug. 23, 2016, 14 pages.

Roy, et al., "An HMM-based behavior modeling approach for continuous mobile authentication", 2014 IEEE International Conference on Acoustics, Speech and Signal Processing (ICASSP), IEEE, May 4, 2014, pp. 3789-3793.

Shi, et al., "Implicit Authentication through Learning User Behavior", Information Security, Springer Berlin Heidelberg, Oct. 25, 2010, pp. 99-113.

Korean Intellectual Property Office; Office Action issued in Appl. No. 10-2017-7027716 dated Feb. 14, 2018.

\* cited by examiner

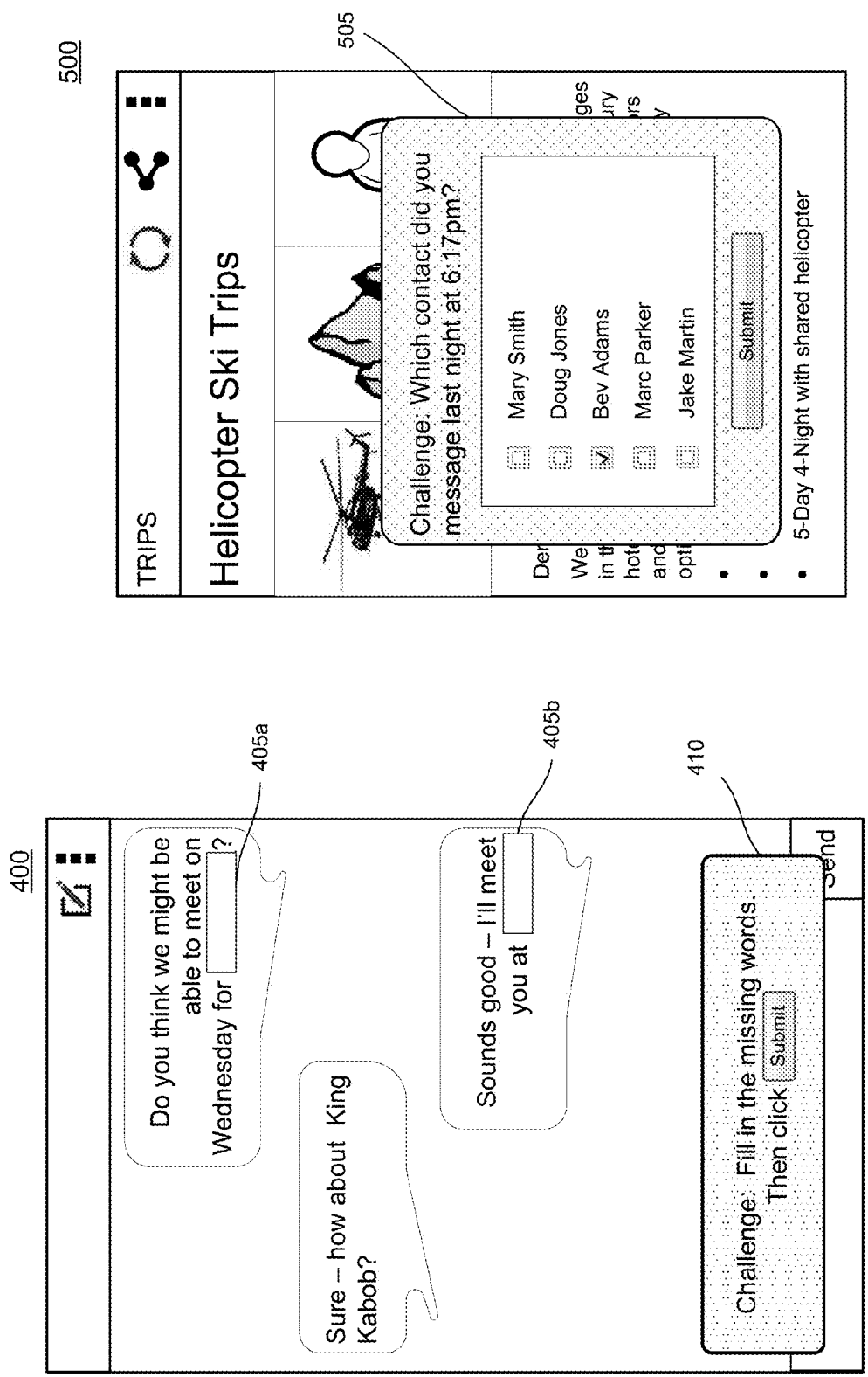

SCREEN-ANALYSIS BASED DEVICE SECURITY

BACKGROUND

The use of mobile devices, such as smart phones, wearable devices, tablets, laptops, etc., has been increasing. These mobile devices can store information that a user considers personal or private. A mobile device that falls into the wrong hands can result in a bad actor having access to that information. While security measures, such as biometrics and passwords, are available to protect access to mobile devices such measures can be seen as cumbersome to users who use a mobile device frequently throughout the day, and may be disabled.

SUMMARY

Implementations learn the behavior and preferences of the device owner(s) and use these signals to detect outlier activity. In other words, the mobile device can use a classification model (e.g. a machine learning algorithm) to detect actions that are not typical for the owner. Initially, the mobile device trains the model by extracting features from content displayed on the screen during sessions that occur in a trusted environment. The trusted environment may exist when the device is located at a safe location, such as the user's home or workplace, or after the user enters a password or series of passwords. A session can be one screen or a series of screens rendered by use of the mobile device. Thus, a session captures content rendered by mobile applications used by the user on the device. After an initial training of the classification model, the device may use the model to analyze current sessions, e.g., current activity. This is an inference stage. Further training may occur when the device is in a safe or trusted environment, but after the initial training the device is capable of entering the inference stage. During the inference stage when content for a session fails to meet a confidence level the device may issue a challenge. In other words, during use of the device, the classification model may determine that the current activity (or a series of activities) represents outlier activity. The challenge may be designed to authenticate the user. The challenge can be passcode-based or can be based on past authenticated sessions of the owner. For example a challenge may ask which person the owner talked to at a particular time or may ask the owner to complete information obscured in a screen recently viewed, e.g., during a session that was consistent with the model. If the challenge is met, i.e., if the user answers correctly, the device may update the classification model with the content from the challenged session. For example, the features generated from the challenged session may be used as positive examples to further train the classifier. If the challenge is not met, the device may enter a lock mode.

In one general aspect, a mobile device includes at least one processor and memory storing instructions that, when executed by the at least one processor, cause the mobile device to perform operations. The operations include identifying content rendered by a mobile application, the content being rendered during a session, generating feature vectors from the content and determining that the feature vectors do not match a classification model. The operations also include providing, in response to the determination that the feature vectors do not match the classification model, a challenge configured to authenticate a user of the mobile device.

In another general aspect, a method may comprise determining that a mobile device is located at a trusted location, capturing information from a session, the information coming from content rendered by a mobile application running on the mobile device during the session, and generating feature vectors for the session. The method also includes repeating the capturing and determining until a training criteria is met and authenticating a user of the mobile device using the trained classification model.

In other general aspects, a mobile device comprises at least one processor and memory storing instructions that, when executed by the at least one processor, cause the mobile device to perform operations. The operations may include identifying content rendered by a mobile application, the content being rendered during a session, and generating feature vectors from the content. The operations may also include applying a classification model to the feature vectors, determining whether the feature vectors match a first user profile based on application of the classification model, the first user profile differing from a second user profile, the mobile device being currently associated with the second user profile, and initiating a profile switch responsive to determining that the feature vectors match the first user profile.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for training a classification model using features generated from content rendered by applications as the user uses the computing device and using the classification model to pass a challenge when atypical usage is recognized, substantially as shown in and/or described in connection with at least one of the figures, and as set forth more completely in the claims.

One or more of the implementations of the subject matter described herein can be implemented so as to realize one or more of the following advantages. As one example, the device can be protected from continued access by anyone but the owner even if the owner did not set up a password or even if the password has been compromised. As another example, the protection is unobtrusive. This means that the protection occurs mostly in the background, without user direction, and creates minimal overhead on the user. As another example, implementations provide an unobtrusive way to switch user profiles on a device shared by multiple users. The content-based security system is based on content presentation on the screen and therefore does not rely on the application rendering the content to provide any of the functionality described herein. In other words, the system functions for all applications and thus all activity performed on the mobile device.

The details of one or more implementations are set forth in the accompanying drawings and the description below. Other features will be apparent from the description and drawings, and from the claims.

BRIEF DESCRIPTION OF DRAWINGS

FIG. 4 is an example display of a mobile computing device with a low-level content-based challenge.

FIG. 5 is an example display of a mobile computing device with a high-level content-based challenge.

Like reference symbols in the various drawings indicate like elements.

DETAILED DESCRIPTION

Figure 1:
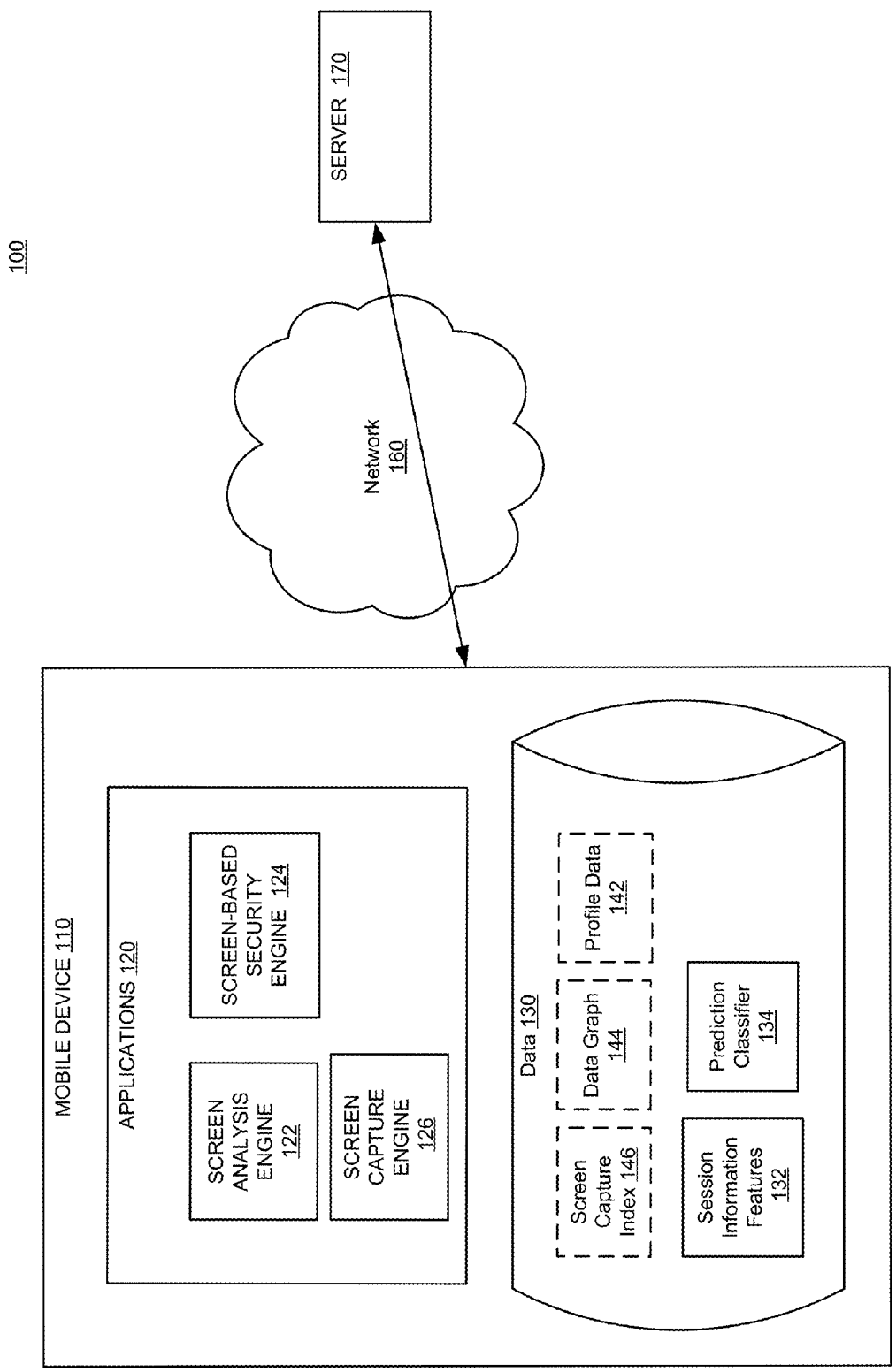
FIG. 1 is a block diagram illustrating an example system in accordance with the disclosed subject matter.

FIG. 1 is a block diagram of a content-based security system in accordance with an example implementation. The system 100 may be used to detect unusual or outlier activities performed on a mobile device and provide a challenge after detecting such activity. The outlier activity may be determined based on a classification model trained using content rendered while the device is used in a trusted environment. The challenge may also be based on content rendered for display on the mobile device. The content-based security system may create minimal overhead for the user, as it runs in the background and can provide security for a mobile device with or without use of a password. The system 100 in FIG. 1 can by a client-server system, with some data processing or data storage occurring at a server 170. However, other configurations and applications may be used. For example, the data processing and data storage can occur exclusively on the mobile device 110. In some implementations, a user of the mobile device 110 may indicate that portions of the processing be performed at the server 170. Thus, implementations are not limited to the exact configurations illustrated.

Figure 8:
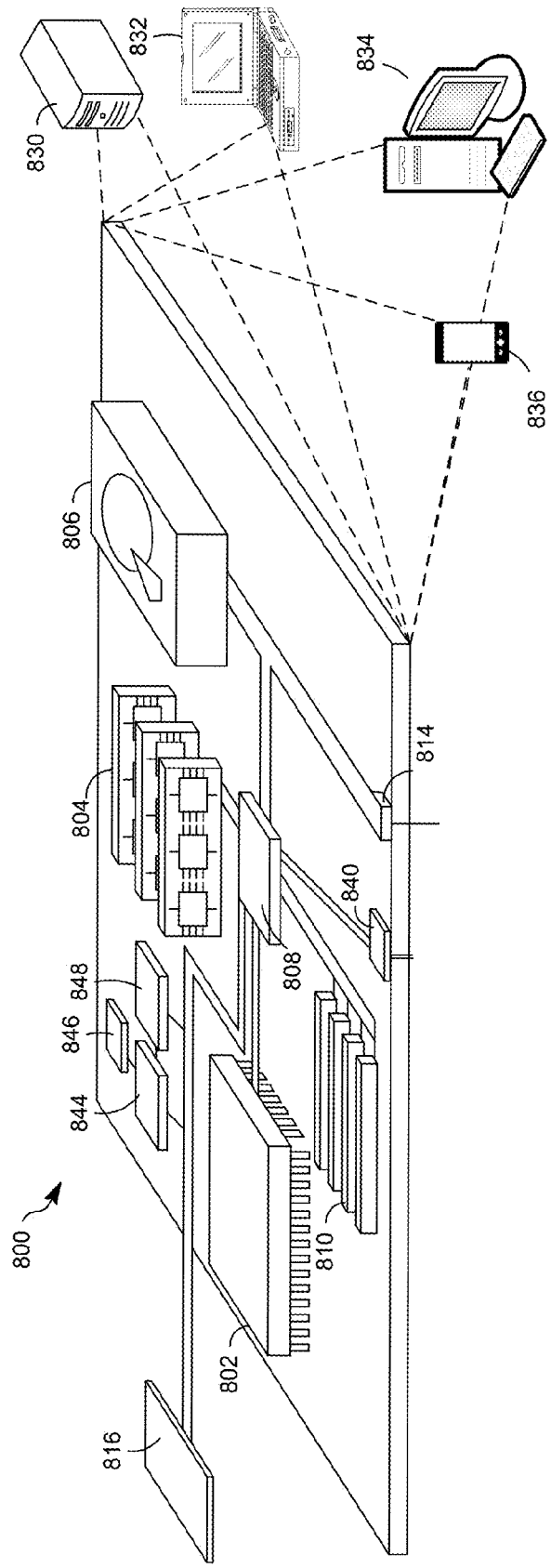
FIG. 8 shows an example of a computer device that can be used to implement the described techniques.

The mobile content-based security system 100 may include a mobile device 110. Mobile device 110 may be any mobile personal computing device, such as a smartphone or other handheld computing device, a tablet, a wearable computing device, etc., that operates in a closed mobile environment rather than a conventional open web-based environment. Mobile device 110 may also be other types of electronic computing devices, such as a laptop or net-based computer. Mobile device 110 may be an example of computer device 800, as depicted in FIG. 8. Mobile device 110 may be a mobile computing device used by a single user, or can be a mobile device shared by multiple users.

Mobile device 110 may include one or more processors formed in a substrate configured to execute one or more machine executable instructions or pieces of software, firmware, or a combination thereof. The processors can be semiconductor-based—that is, the processors can include semiconductor material that can perform digital logic. The mobile device 110 may thus include one or more computer memories configured to store one or more pieces of data, either temporarily, permanently, semi-permanently, or a combination thereof. The mobile device 110 may thus include applications 120, which represent machine executable instructions in the form of software, firmware, or a combination thereof. The components identified in the applications 120 may be part of the operating system or may be applications developed to run using the operating system. In some implementations, applications 120 may be mobile applications. Conventionally, mobile applications operate in a closed environment, meaning that the user employs separate applications to perform activities conventionally performed in a web-based browser environment. For example, rather than going to bookit.com to book a hotel, a user of the mobile device 110 can use a mobile application in applications 120 provided by bookit.com. Applications 120 may also include web applications, which may mirror the mobile application, e.g., providing the same or similar content as the mobile application. In some implementations, the applications 120 may include functions performed by an operating system of the mobile device 110.

The applications 120 may include a screen capture engine 126, a screen analysis engine 122, and a screen-based security engine 124. In some implementations, one or more of these applications can be provided by the operating system of the mobile device 110. In some implementations, one or more of these applications can be downloaded and installed by the user.

The screen capture engine 126 can include various functionalities. In some implementations, the screen capture engine 126 may be configured to get textual information represented on the screen from an application program interface (API). In some implementations, the screen capture engine 126 may be built into the operating system, which can determine the content of text fields displayed on the current screen. The textual information may be considered screen captured content, and each call to the API or each time the content of text fields is determined may be considered a screen capture. In some implementations, the screen capture engine 126 may be configured to capture the screen by copying or reading the contents of the device's frame buffer. Thus, the captured screen may be an image and may be referred to as a captured image. The screen capture engine 126 may capture the screen at intervals. The interval can be small, for example every half second or every second. In some implementations, the screen capture engine 126 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen capture engine 126 may increase the interval at which a screen capture occurs when the screen does not change. In other words, when the screen is static, the screen capture engine 126 may capture images less often. The screen capture engine 126 may provide the captured content or screen images and metadata to a recognition engine, which may be part of the screen capture engine 126 and located on the mobile device 110 or a server, such as server 170. If a screen capture image is provided to the recognition engine, the recognition engine may identify words, entities, logos, etc. in the content of the screen capture image. Thus, the recognition engine may generate recognized content, which can be from words as well as images. The metadata may include the timestamp, the mobile device type, a mobile device identifier, the mobile application running when the content was captured, e.g., the application that rendered the content displayed on the screen, etc. In some implementations, the metadata may also include which applications are active, the location of the device, ambient light, motion of the device, etc. The system may use this additional device information to assist in content analysis (e.g., entity disambiguation), feature generation (e.g., deciding what content is most relevant), etc. The recognition engine may thus be configured to perform various types of recognition, such as character recognition, image recognition, logo recognition, etc., using conventional or later developed techniques.

The mobile device 110 may also include a screen analysis engine 122. The screen analysis engine 122 may be configured to determine a session and generate features based on the content identified in the session. A session is one or more screen capture content events. In other words, a session can be the captured content from one screen capture image or a series of related screen capture images (e.g., images captured during a specified window of time, images captured during performance of an action, images captured while a particular user interface element is used, images captured during usage of a particular application, images captured during a particular task, etc.). Likewise, a session can also be content from one API call or a series of API calls, etc. The screen analysis engine 122 may generate feature vectors for a session. Features include data items identified by the screen capture engine 126 in the captured content included the session and the metadata for the captured content. For example, features can include entities, words, or images, pixels, or image features identified in the content, the application that rendered the content, the date/time, whether the device was moving (e.g., in a car), etc. The information about one feature may be combined in a feature vector and many feature vectors may be concatenated into an aggregate feature vector a session. The screen analysis engine 122 may provide the aggregate feature vector, or in other words the various individual feature vectors, to a classification model, either for training purposes or for analysis.

A classification model, such as prediction classifier 134, is any type of machine-learning classifier, such as a long short-term memory (LSTM) neural network, feed-forward neural network, a support vector machine (SVM) classifier, etc., that is either a binary classifier (for a device with one user) or a multi-class classifier (for a device with multiple users). The classification model has two modes, a training mode and an inference mode. In the training mode the screen analysis engine 122 uses feature vectors generated from captured content, (e.g., content displayed on the mobile device) as positive training examples for the classification model. When enough training data has been collected, the screen analysis engine 122 may obtain generic negative examples or may intelligently permute the positive examples to generate negative examples. For example, the screen analysis engine 122 may replace some of the words/entities in captured content with similar words/entities. As one example, a place or person may be replaced with another place or person. When the model is a multi-class classifier the system may use positive examples for one user as the negative examples for another user. In some implementations, the screen may train the model without negative examples. The screen analysis engine 122 may then train the classification model using the positive and negative examples (where negative examples are used). Training the classification model creates the prediction classifier 134, which may then be used in an inference mode. The screen analysis engine 122 may continue training of the classification model, for example with additional positive examples, to refine the model.

In some implementations, the system may train multiple classification models. For example, one model may be used for content rendered by a particular application or a particular application category. For instance, one model may be used for games and another model may be used for news applications. Thus, the prediction classifier 134 may represent more than one trained classifier.

In some implementations, the screen capture engine 126 can include an indexing engine configured to index the captured content. The index may also associate a screen capture image with the text, entities, images, logos, etc. identified in the image. Thus, for example, the indexing engine may generate index entries (e.g., stored in screen capture index 146) for a captured image and captured content. In some implementations the indexing engine may be on a server, such as server 170, and the screen capture engine 126 may provide the captured image and captured content to the server. The index may be an inverted index, where a key value (e.g., word, phrase, entity, image, logo, etc.) is associated with a list of images (e.g., copies of the captured screen images) that include the key value. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 146. Of course, in some implementations the system may store the index in a user account on a server in addition to or instead of on the mobile device 110. The user of the mobile device 110 may control when the screen capture engine 126 is active. For example, the user may specify that the screen capture engine 126 is active only when other specified mobile applications 120 are running (e.g., only when in a social media mobile application). The user may also manually turn the screen capture engine 126 on and off, for example via a settings application. In some implementations, the user may invoke the screen capture engine 126 with a gesture or action. Disabling the screen capture engine 126 may also disable the screen-based security measures described herein.

The applications 120 may also include screen-based security engine 124. The screen-based security engine 124. The screen-based security engine 124 may use the prediction classifier 134 in an inference mode to provide unobtrusive security for the mobile device 110. The screen-based security engine 124 may receive session-based features from the screen analysis engine 122 and the screen capture engine 126 and run the features against the prediction classifier 134. If the prediction classifier 134 indicates the features are outliers (e.g., do not fit into the model with a sufficient confidence level), the screen-based security engine 124 may offer a challenge to the user. The challenge can be password-based (e.g., requesting the user enter a password) or content-based (e.g., based on information found in the screen capture index 146 or the session features 132).

A content-based challenge is useful as it can be used to identify a bad actor who has hacked or stolen the user's password. The information in the session features 132 include features extracted from content generated at a trusted location and/or content generated for a past session that did not fall outside the confidence level for the prediction classifier 134. In other words, the information in the session features 132 represents information from a verified session, e.g., matching a trusted location or matching the classification model, and are typical for the user of the mobile device 110, not outlier activity. The screen capture index 146 may include a copy of a previously captured screen and key items, such as words, entities, or pictures, identified in captured content.

The screen-based security engine 124 may use information from the session information feature 132 and/or the screen capture index 146 to generate a content-based challenge. For example, the screen-based security engine 124 can present a previously captured screen (e.g., from screen capture index 146) with one or more key items obscured and request that the user provide the obscured information. As another example, the screen-based security engine 124 may extract high level information from the session features 132 or the screen capture index 146. For example, the screen-based security engine 124 may ask which person a user talked to or texted last night, which entity the user searched for two days ago, what restaurant the user frequents most often, what application the user typically uses for a task (e.g., for reading email or booking a restaurant), etc. The content-based challenges provide additional layers of security that protect a device without a password or a device where the password has been stolen or hacked.

The mobile device 110 may include data stores 130, which are stored in the memory of the mobile device 110 and used by the applications 120. In some implementations, the data stores 130 may include a screen capture index 146 which includes items identified in the screen capture images, and a data graph 144. The data graph 144 may be a graph-based data store that stores data and rules that describe knowledge about the data in a form that provides for deductive reasoning. For example, in a knowledge base, information may be stored about entities in the form of relationships to other entities. An entity may be may be a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. The data graph 144 may be a subset of entities and relationships in a larger knowledge base located at server 170, especially if the large knowledge base includes millions of entities and billions of relationships. For example, the entities and relationships in the data graph 144 may represent the most popular entities and relationships from a knowledge base, or may be selected based on user preferences. For example, if the user has a profile, entities and relationships may be selected for inclusion in data graph 144 based on the profile or based on the types of entities frequently identified in the content of the screen capture images. In some implementations the data graph 144 may include entities frequently recognized in the content of screen capture images. Such entities may be considered personal entities, i.e., entities the user interacts with frequently but are not well known to the public at large. Thus, data graph 144 may include entities not necessarily found in a large public knowledge base. Such personal entities may include people as well as phone numbers, addresses, cities, etc. the user interacts with often.

The data stores 130 may also include session features 132. The session features 132 may represent positive examples, e.g., features identified from content generated in a trusted environment. A trusted environment may be a location identified as trusted by the user of the mobile device 110, or an environment that exists after the user has entered a password, or a combination of these. The session features 132 may be used to train the prediction classifier 134 and/or to provide information used in a challenge. The session features 132 may also include features generated during a session that the classification model determined to be consistent with the activities of the user. In some implementations, the system may have a higher threshold for storing these features than the threshold used to determine whether a session is consistent with the profile. In other words, to be included in session features 132, the confidence level must be higher than for the features to be considered typical for the user.

The data stores 130 may also include profile data 142. The profile data 142 may include information about a user of the mobile device. For example, profile data 142 may include locations considered trusted (e.g., the user's work or home), password data, preferences, and other data typical for a user account or profile. In some implementations, the screen capture index 146, the data graph 144, and the profile data 142 may also reside on server 170, e.g., in an account associated with the user of the mobile device 110. In some implementations, the screen capture index 146, data graph 144, and profile data 142 may be copies of or subsets of data stored on the server 170 or in another location specified by the user. The data stores 130 may be stored on any non-transitory memory.

In a mobile device 110 that has several users, such as a shared family tablet or laptop, each user may have a respective data store 130. In other words, each user may have an individual copy of the screen capture index 146, the profile data 142, and the session features 132. In such an implementation, the prediction classifier 134 may be a multi-class classifier, able to analyze captured content for a current session and classify the content as fitting one of two or more profiles, or as fitting none of the profiles (e.g., outlier activity). In such an implementation, each user may initiate a training session for the prediction classifier 134 via the screen analysis engine 122.

Figure 9:
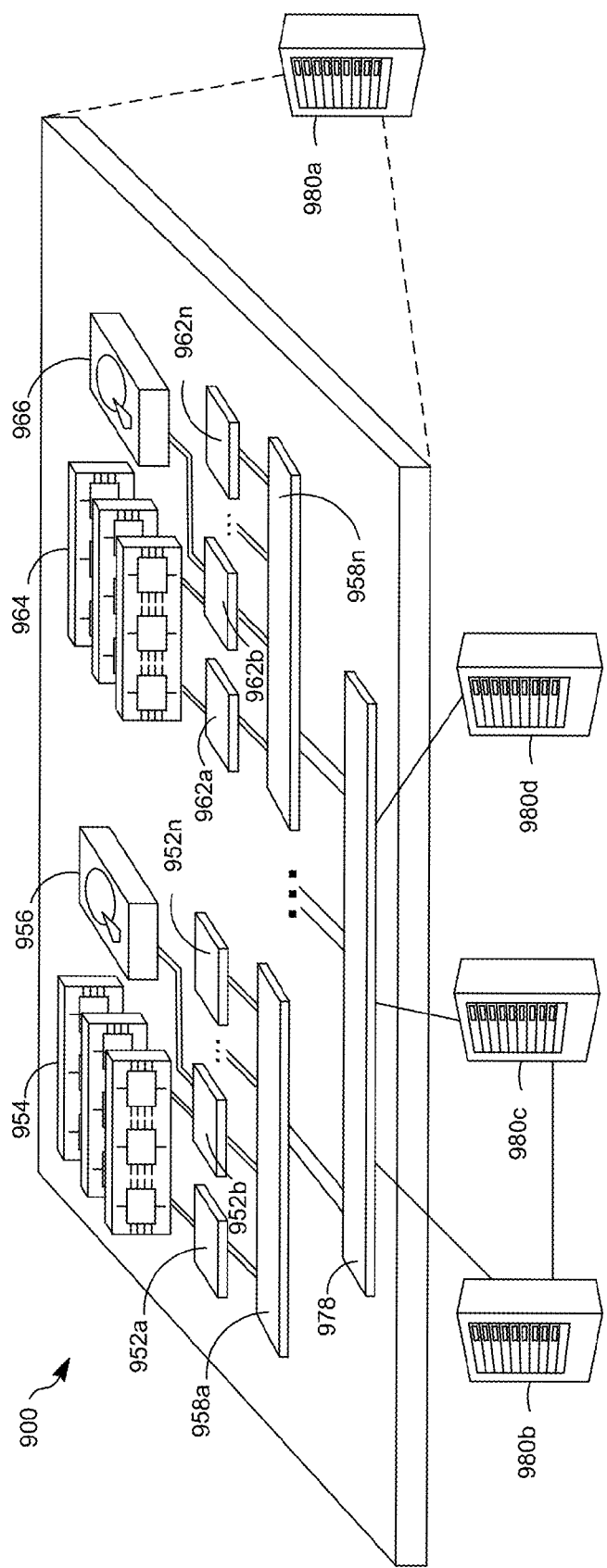
FIG. 9 shows an example of a distributed computer device that can be used to implement the described techniques.

The mobile content-based security system 100 may include a server 170, which may be a computing device or devices that take the form of a number of different devices, for example a standard server, a group of such servers, or a rack server system. For example, server 170 may be implemented in a distributed manner across multiple computing devices. In addition, server 170 may be implemented in a personal computer, for example a laptop computer. The server 170 may be an example of computer device 800, as depicted in FIG. 8, or computer device 900, as depicted in FIG. 9. Server 170 may include one or more processors formed in a substrate configured to execute one or more machine executable instructions or pieces of software, firmware, or a combination thereof. The processors can be semiconductor-based—that is, the processors can include semiconductor material that can perform digital logic.

The server 170 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 170. In some implementations, server 170 may store backup copies of one or more of the information files in data store 130, may provide source data for one or more of the information files in data store 130, and/or may perform one or more of the functions of the screen content engine.

Figure 2:
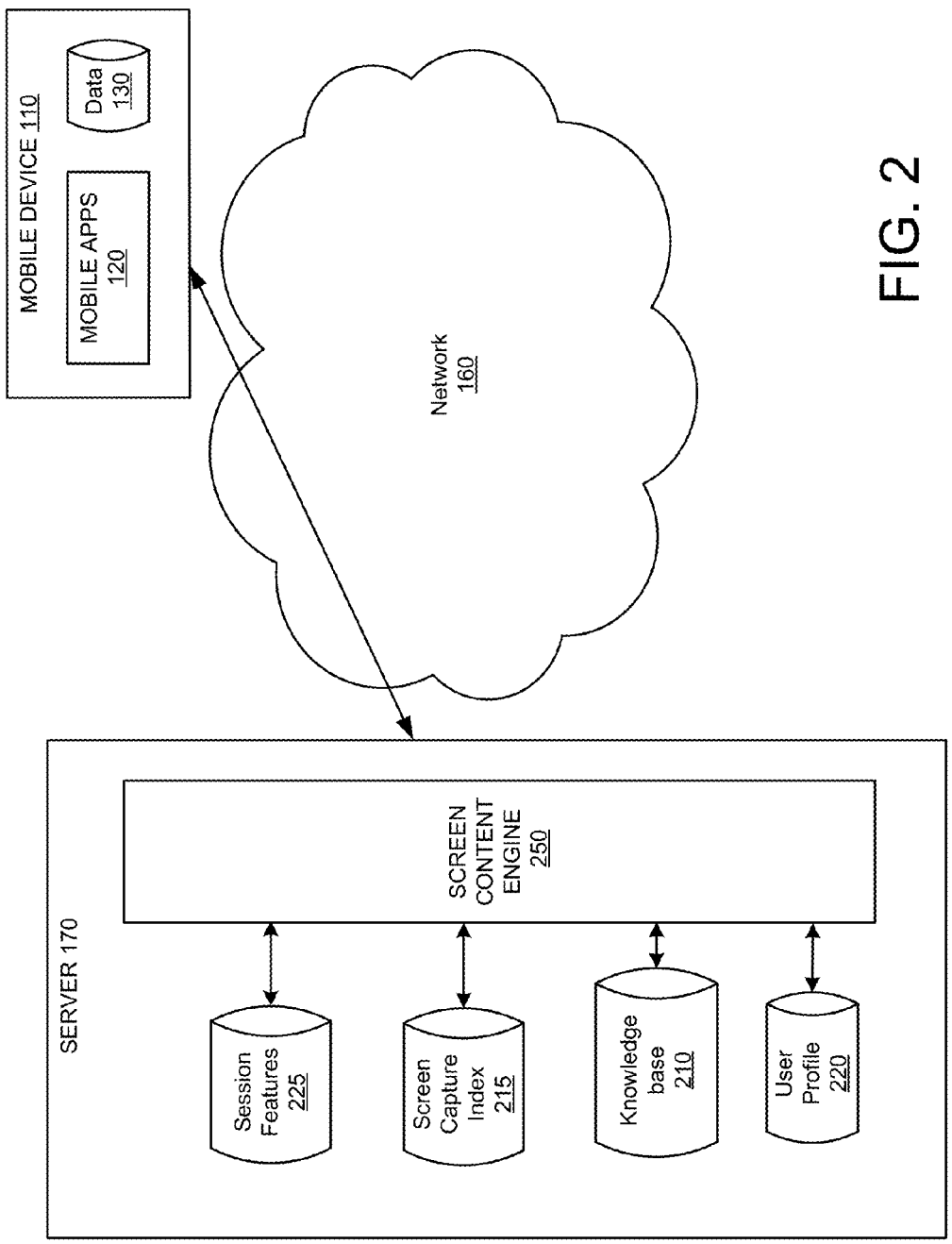
FIG. 2 is a block diagram illustrating another example system in accordance with the disclosed subject matter.

FIG. 2 is a block diagram illustrating an example system in accordance with the disclosed subject matter. FIG. 2 illustrates an implementation of system 100 with one or more of the functions of the screen content engine 250 occurring at the server 170. For example, the screen content engine 250 may receive a screen capture image from the screen capture engine 126 on mobile device 110 and may perform the recognition to identify key items in the image and may index the image with the key items. In some implementations, the screen content engine 250 may generate feature vectors for the image or a series of images. In other words, the screen content engine 250 may generate feature vectors for a session, as described above.

The server 170 may store knowledge base 210. The knowledge base 210 may be a large graph-based data store that stores data and rules that describe knowledge about the data in a form that provides for deductive reasoning. A knowledge base with a large number of entities and even a limited number of relationships may have billions of connections. In some implementations, knowledge base 210 may be stored in an external storage device accessible from server 170 and/or mobile device 110. In some implementations, the knowledge base 210 may be distributed across multiple storage devices and/or multiple computing devices, for example multiple servers. The entities and relationships in the knowledge base 210 may be searchable, e.g., via an index. For example, the index may include text by which an entity has been referred to. Thus, reference to the knowledge base 210 may be understood to include an index that facilitates finding an entity using a text equivalent.

The screen content engine 250 may include components that analyze the screen content in a screen capture image and to identify key items, such as words, entities, logos, etc., in the screen content. Identified entities may be entities that are in the knowledge base 210. Accordingly, the screen content engine 250 can be configured to perform various types of recognition, such as character recognition, image recognition, logo recognition, etc., using conventional or later developed techniques. The screen content engine 250 may match the items identified (e.g., text, images, logos) to entities in the knowledge base 210. In some implementations, the screen content engine 250 may index the key items, as discussed above, storing the inverted index in screen capture index 215. The screen capture index 215 is associated with a user of the mobile device 110. In some implementations, the screen content engine 250 may also generate session features 225, similar to session features 132 of FIG. 1. In some implementations, the session features 225 may be transmitted to the server 170 from the mobile device 110. In other words, the screen analysis engine 122 may generate the features and may transmit the features to the server 170, where they are stored as positive examples for the user. In some implementations, the screen content engine 250 may determine when a sufficient quantity of positive examples exists for training the model. In some implementations, the screen content engine 250 may reserve a quantity of positive examples and evaluate the model against the examples. In such implementations, the screen content engine 250 may determine when the model has a sufficient classification error (e.g., 95% accuracy or 99% accuracy, etc.) In some implementations, the server 170 may store a user profile 220. The user profile may include information similar to profile data 142.

Returning to FIG. 1, the mobile device 110 may be in communication with the server 170 and with other mobile devices over network 160. Network 160 may be for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160 the server 170 may communicate with and transmit data to/from mobile device 110 and mobile device 110 may communicate with other mobile devices (not shown).

The mobile content-based security system 100 represents one example configuration and implementations may incorporate other configurations. For example, some implementations may combine one or more of the components of the screen capture engine 126, the screen analysis engine 122, or the screen-based security engine 124 into a single module or engine. Similarly, some implementations may combine one or more of the screen capture engine 126, the screen analysis engine 122, and the screen-based security engine 124 into a single module or application. Furthermore, one or more of the components of the screen capture engine 126, the screen analysis engine 122, or the screen-based security engine 124 may be performed at the server 170. As another example one or more of the data stores, such as the screen capture index 146, the data graph 144, the profile data 142, and the session features 132, or the prediction classifier 134 may be combined into a single data store or may distributed across multiple computing devices, or may be stored at the server 170 or another location specified by the user.

To the extent that the mobile content-based security system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to store screen capture images and content. For example, the system may refrain from capturing content for certain applications, such as banking applications, health applications, or other similar applications or where capturing such content violates terms of service. In addition, the user may be provided with the opportunity to disable capturing screen content for specific applications or categories of applications. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a mobile content-based security system.

Figure 3:
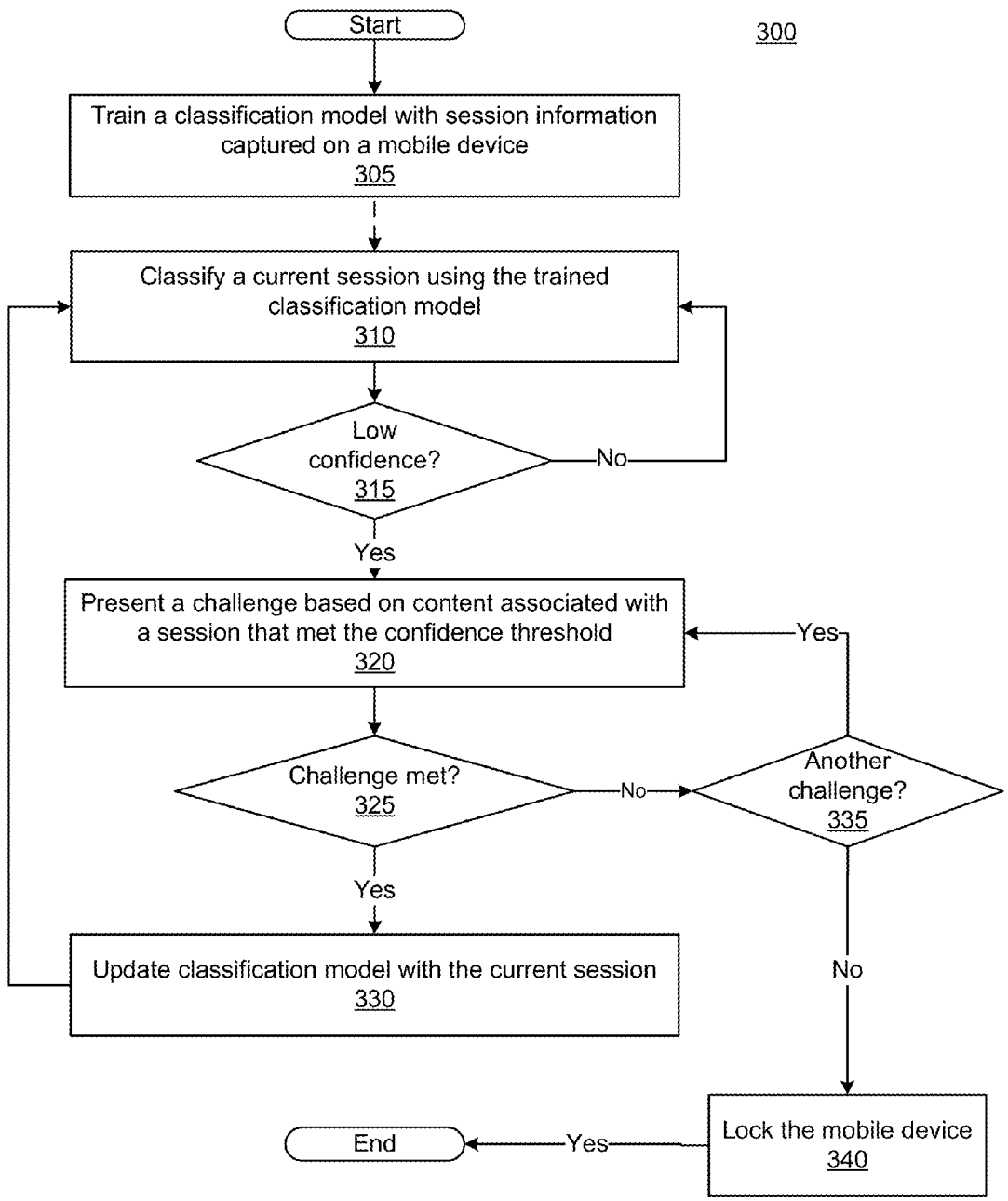
FIG. 3 illustrates a flow diagram of an example process for using screen-analysis to enhance device security, in accordance with disclosed implementations.

FIG. 3 illustrates a flow diagram of an example process for using screen-analysis to enhance device security, in accordance with disclosed implementations Process 300 may be performed by a mobile content-based security system, such as system 100 of FIG. 1 or FIG. 2. Process 300 may be used to provide unobtrusive security or backup security in a mobile environment, ensuring that a bad actor cannot continue to access the mobile device. Process 300 may begin by training a prediction classifier with session information captured on a mobile device (305). This is a training mode for the device and may take place when the device is in a trusted environment, as explained in more detail with regard to FIG. 4.

Once the classification model is trained, the system may enter an inference mode using the classification model. The inference mode may run until the user provides instructions to quit the inference mode or until the device enters a locked mode. Thus, the inference mode may protect a device even when the device is not locked with a password, i.e., a password is not needed to activate the device from a sleep or inactive mode. Even when the device is protected with a password, the inference mode protects the content of the device if the password is compromised or stolen.

In the inference mode, the system may classify a current session using the classification model (310). The session can be one screen or a series of related screens. Thus, the session represents content rendered by a mobile application and displayed on the mobile device. To classify the current session, the system may perform recognition on the captured screen image(s) that make up the session to identify content (e.g., key items) displayed in the screen capture image(s). The system may also recognize entities in the captured content, whether text-based or recognized from the image. The system may generate feature vectors from the captured content and provide the feature vectors, e.g., in the form of an aggregated feature vector, to the classification model. The classification model may determine how well the features fit the trained model (315). In other words, the classification model takes the feature vectors and determines a confidence score that reflects how well the features fit within the model. The system may determine whether the session has low confidence based on the current session alone, or based on a mean of confidence scores for sessions occurring over a window of time. If the confidence score or the mean confidence score meets or exceeds a threshold (315, No), the features are consistent with the model and the system may continue classifying sessions (310). If the confidence score for the current session or the mean confidence score over a window of current sessions fails to meet the threshold (315, Yes), the system may determine that the activity is an outlier and may represent the activity of an unauthorized user.

Accordingly, the system may present a challenge to the user (320). In some implementations, the challenge may be to enter a pre-set password. In other implementations, the challenge may be based on captured content associated with a previous session that did meet the confidence threshold (320). In some implementations, the challenge may include a combination of the password and challenge questions based on captured content associated with previous sessions. The previous session should be a session that occurred a few hours before the current session, but preferably no earlier than a couple of days prior to the current session. This ensures that the legitimate user can remember what occurred in the previous session but that the session did not occur recent enough for an unauthorized user to view it.

The challenge can be one question or a series of questions. In other words, to avoid a lucky guess, the system may present a series of questions as the challenge and require the user to answer at least a majority (e.g., 2 of 3) right to meet the challenge. The challenge questions may be formed from content associated with the previous session. In some implementations, the series of questions can be a combination of a password-based challenge and one or more captured-content based challenges.

FIG. 4 is an example display 400 of a mobile computing device with a low-level content-based challenge. The display 400 is an example of a challenge based on a previously viewed screen capture image. The previously viewed screen may be stored, for example, as part of an index of captured screens, for example screen capture index 146 of FIG. 1 or screen capture index 215 of FIG. 2, or as part of session information, such as session features 132 of FIG. 1 or session features 225 of FIG. 2. The previously viewed screen image may have been captured during a session or a window of sessions that was consistent with the classification model and/or that occurred in a trusted environment. In some implementations, the previously viewed screen may have a timestamp that is at least a minimum number of hours in the past. The minimum is long enough to ensure that the image is from a previous period of use of the device. A period of use may be defined, for example, as the period between the device entering an inactive state. The device enters an inactive state when a user fails to interact with the device within a predefined time period. Conventionally, the user must tap or swipe the touch-screen to reactivate the device.

To generate the challenge, the system may obscure portions 405 of the previously viewed screen image. For example, the words under portions 405a and 405b are obscured. A portion 405 may be selected as being a highly topical entity appearing in the previously viewed screen capture image. The system can determine highly topical entities using conventional entity detection and language analysis techniques. The system may provide an instruction window 410 that informs the user how to meet the challenge. For example, the instruction window 410 may request that the user provide the text corresponding to the obscured portions. In the example of display 400, the system provides a text box for the user to provide text corresponding to portions 405a and 405b. However, the system may also offer a multiple choice question that allows the user to select one of the offered choices. In addition, the obscured portion need not be text. The system can select an image to obscure and offer multiple images for the user to select. When the user has provided a response for each obscured portion 405, the user may select or activate a control provided, for example in the instruction window 410, to submit the response to the challenge.

FIG. 5 is an example display of a mobile computing device with a high-level content-based challenge. The display 500 is an example of a challenge based on previous activity, not necessarily a single previously viewed screen capture image. For a high-level content-based challenge, the system may access information from a previous session that was consistent with the classification model and/or that occurred in a trusted environment. The information may be obtained, for example, from session features extracted during the previous session. Like the low-level content-based challenge, the session may be associated with a time stamp that is at least a minimum number of hours in the past. The high-level content-based challenge may thus be based on past analysis of screen capture images. The system may extract facts from the past session and ask the current user to correctly answer a question based on the facts. In the example of display 500, the system asks the user to indicate who the user messaged last night at 6:17 p.m. The example of display 500 includes a multiple choice challenge, but could also use a text box type of response. Other types of fact questions that can be formulated from a past session include "What restaurant did you make a reservation at on Friday?" and "Which image did you share via social media most recently?" Other types of high-level content-based challenges may be derived from aggregated usage data. For example, the system may determine which contact the user messages most often, which places the user reserves most frequently, etc. In generating sub-challenges, the system may include challenges that are diverse across applications and in terms of entity types. In other words, the system may ensure that the sub-challenges represent a variety of applications and/or entities considered typical for the user.

Returning to FIG. 3, the system may determine whether the presented challenge is met (325). As indicated above, the challenge may include multiple sub-challenges, depending on the implementation. If the challenge is not met (325, No), the system may determine whether to present another challenge (335). For example, the system may provide a user who failed the first challenge another opportunity with a new challenge (335, Yes), but may not provide a third opportunity (335, No). In some implementations, especially when the challenge already included sub-challenges, the system may not provide any additional opportunities to meet another challenge (335, No). When there are no other challenge opportunities (335, No), the device may enter a lock mode (340). In the lock mode, the device may prevent access to most applications and activities. For example, the device may enable emergency calling only and disable all other access. In another example, the device may send a communication to a user email address or other user identifier associated with the device indicating the location where the device entered the lock mode. In some implementations, the device may be unlocked when the device is located at a trusted location and the user provides a password. For example, a user profile may include trusted locations, such as the user's home or work. When the user is at home or work (e.g., based on global positioning coordinates), the device may allow a user to enter a password to unlock the device. This may enable a legitimate user who accidently locked the device to unlock the device without having to contact customer support. In some implementations, unlocking the device may require identity verification, for example via a call to customer support. In some implementations, unlocking the device may require only entry of a password. Other methods of unlocking the device once locked may also be used.

If the challenge is met (325, Yes), the system may extract features from the current session and use the features (e.g., feature vectors for the features) as positive examples to update the classification model (330). In other words, upon successful completion of a challenge, the system may train the classification model to recognize the current activity as consistent with the user's behavior. The system may continue to analyze and classify sessions until a user stops the inference mode or until the device is locked.

Figure 6:
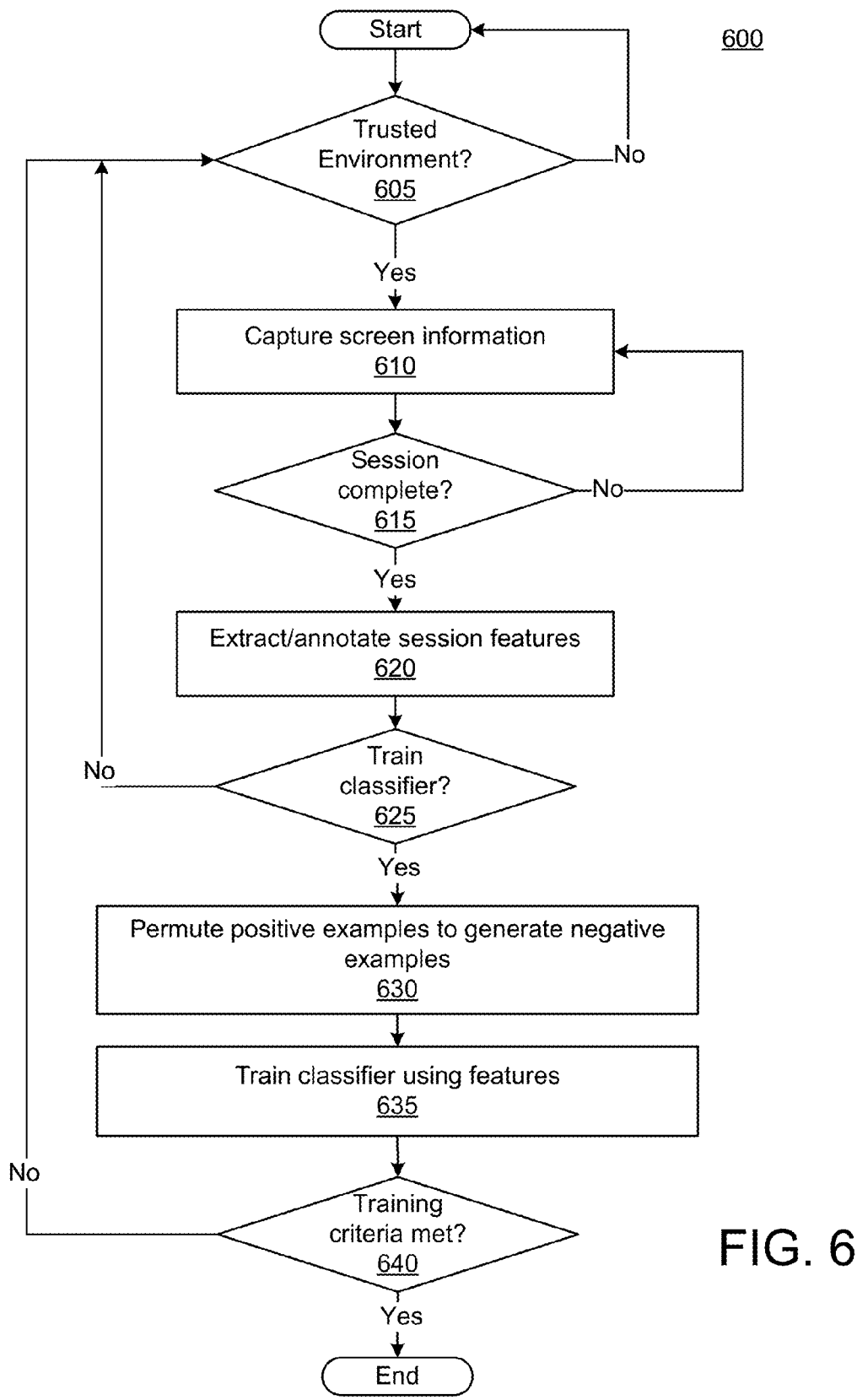
FIG. 6 illustrates a flow diagram of an example process for training a profile classification model, in accordance with disclosed implementations.

FIG. 6 illustrates a flow diagram of an example process 600 for training a classification model, in accordance with disclosed implementations. Process 600 may be executed by a mobile content-based security system, such as system 100. Process 600 may collect information while the device is used in a trusted environment and use the information to train the classification model to recognize activity consistent with the user profile. The classification model can be a binary classifier that indicates whether captured content, e.g., information on a particular screen capture image, or a sequence of such images, is consistent with a activity of a device owner. In other implementations, the classification model may be a multi-class classifier trained to determine which user profile of multiple profiles, if any, the particular screen capture image or sequence of images is most consistent with. If a multi-class classifier, the model is trained using multiple training sessions, one for each user profile the model is trained to recognize. Thus, while process 600 as illustrated is for a binary classifier, it may be executed for each different user of a mobile device to train a multi-class classifier model.

Process 600 begins with a determination of whether the device is in a trusted environment (605). A trusted environment is an environment where there is a high confidence that the user of the device is the true device owner. Determining whether the environment is a trusted environment may be dependent on a number of factors, alone or in combination. For example, the user may provide a password that enables the training mode. As another example, the user profile may include locations that are trusted, such as the home or office of the user. The device can determine using GPS coordinates or a wireless network identifier whether the current location matches one of the trusted locations. In some implementations, the trusted environment may require a successful password unlock (e.g., awaking the device from a sleeping or inactive mode) as well as a match of a trusted location. If the device is not in a trusted environment (605, No), no training data is kept. Once the device is in a trusted environment (605, Yes), the system may begin capturing screen content (610). As indicated above, the capture of screen content may take place at regular intervals, each time the user interacts with the device, upon an explicit command from the user, etc. The screen information thus represents the information rendered by an application running on the device. The system may continue capturing content (615, No) until a session is complete (615, Yes). A session can be defined as a single screen capture event (API call or screen capture image). Thus, one screen capture image may result in the session being complete. As another example, a session may be defined as a series of screen capture events. For example, the screen capture events occurring in a specified window, events occurring during a specific activity, events occurring in a single applications, or events occurring during use of a single interface, etc. When a session is complete (615, Yes), the system may extract and annotate session features. Features may be anything recognized in the content associated with the session as well as metadata about the content. For example, features can include the program that rendered the content, the location of the mobile device, the motion of the mobile device, the words, pictures, and logos recognized in the content, the entities (e.g., from the knowledge base) identified in the content, etc. The information about a particular feature may be represented by a corresponding feature vector, and the feature vectors may be combined (concatenated) in an aggregated feature vector for a single screen or for a session. The feature vectors may be considered positive examples of activity for the user. In other words, the screens can be parsed and annotated as positive training examples of the type of activity typical for the user.

The system may determine whether there are enough positive examples to train the classifier (625). For example, the system may require a minimum amount of time (e.g., a couple of weeks, a minimum number of hours) to observe enough behavior in a trusted environment to ensure a useful classification model. As another example, the system may require a minimum number of positive examples, or some combination of a minimum number of positive examples and a minimum amount of time in training mode. Until the minimum criteria is met (625, No) the system continues collecting information (features) when the device is in a trusted environment. Once the minimum criteria is met (625, Yes), the system may get negative examples. The negative examples may be a generic set of negative examples or may be generated by randomly but realistically permuting positive examples (630). Permuting positive examples can include replacing some of the words/entities in captured content with similar words/entities. As one example, a place or person may be replaced with another place or person. In a multi-classifier model permuting positive examples includes using positive examples for one user as the negative examples for another user The system may then use the positive and negative examples to train the classifier(635). In some implementations, the system may train the classifier without any negative examples. The system may determine whether the training criteria is met. The training criteria may be, for example a minimum amount of time, a minimum number of positive examples, as described above or a minimum classification accuracy. For example, the system may use some examples to train the model, and then run the model against other examples (or the same examples), to determine how well the model classifies the known examples. In some implementations, a minimum number of examples may be used to train the classifier, and then another minimum may be collected and used to evaluate the model. Some implementations may use a combination of a minimum time period, a minimum number of examples and a minimum classification accuracy as the training criteria. Until the training criteria is met (640, No) the system continues collecting information (features) when the device is in a trusted environment. Once the training criteria is met (640, Yes), process 600 then ends the model is ready for use in an inference mode. However, the system may continue to train the classification model using new positive examples. In some implementations, training may continue continuously for a minimum period of time (when in a trusted environment) or the system may train the model when the user successfully meet a challenge with the session information that prompted the challenge. In addition, the system may enter a training mode at certain intervals when the device is in a trusted environment. Thus, the system may refine the model and keep it current as the user engages in new activities.

Figure 7:
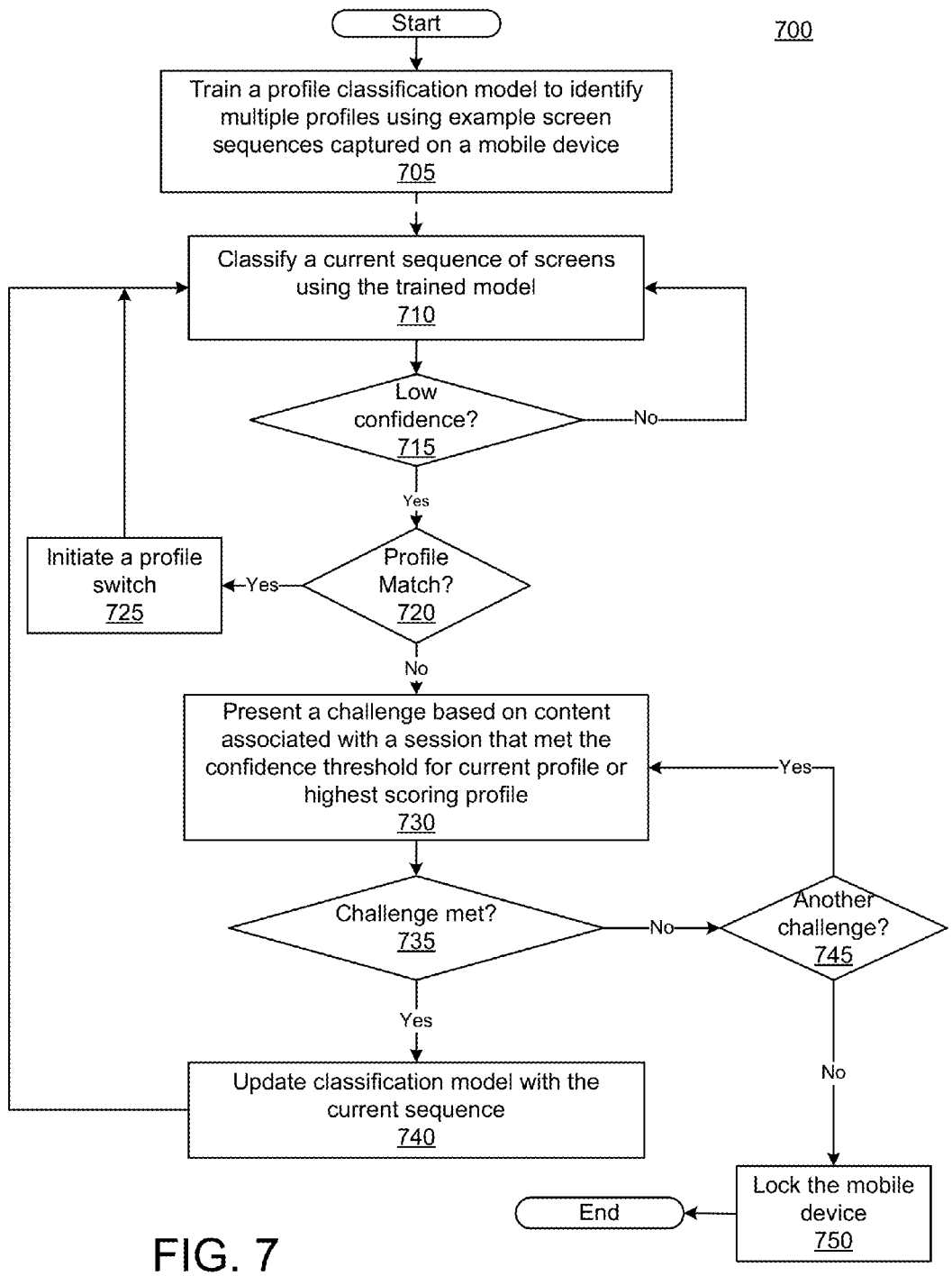
FIG. 7 illustrates a flow diagram of an example process for using screen-analysis to enhance device security in a multi-user environment, in accordance with disclosed implementations.

FIG. 7 illustrates a flow diagram of an example process 700 for using screen-analysis to enhance device security in a multi-user environment, in accordance with disclosed implementations. Process 700 may be performed by a mobile content-based security system, such as system 100 of FIG. 1 or FIG. 2. Process 700 may be used to provide unobtrusive security or backup security in a mobile environment, as well as automatically initiating (e.g., without a specific instruction) a profile switch in a multi-user environment. Process 700 may begin by training a profile classification model to identify and classify multiple different profiles (705). The training is accomplished using content recognized in screens when the device is in a trusted environment, as described above with regard to FIG. 6. In a profile classification model, each training session, and thus the positive examples generated, is associated with a specific user. Thus, the model is able to learn activities typical for each user. Accordingly the profile classification model can be any type of multiple classifier.

Once two or more profiles are sufficiently trained, the system may enter an inference mode. In an inference mode, the system may observe content in a screen or series of screens, in other words a session, and classify the session using the trained model (710). In observing the content, the system may perform various types of recognition on a screen capture image, the image having been rendered by an application, e.g., a mobile application, a web-based application, or another type of application, or on captured text. The system may then determine feature vectors of the content and provide the feature vectors to the classification model. The classification model provides a determination of whether the features (e.g., as represented by the feature vectors) match a profile or not. The determination may include a confidence level, which represents how certain the model is that the input (the feature vector) is consistent with a particular profile. Thus, for example, the determination may indicate that the input matches a first user profile with a 70% confidence score and matches a second user profile with a 50% confidence score.

The system may determine whether the model returns a low confidence for the signed-on user (715). A low confidence may be measured against a threshold, for example failing to meet a threshold. A low confidence may indicate that the current activity is not consistent with the signed-on user. If the confidence is not low (715, No), the system may continue classifying actions (710). If the confidence is low (715, Yes), the system may then determine whether the current activity matches a profile for another user (720). Whether the activity, e.g. the feature vectors generated from the content displayed on the screen, are consistent with a profile depends on the confidence score of a particular profile meeting or exceeding a threshold. If the system determines that at least one confidence score for another user profile (e.g., different than the signed-in user) does meet or exceed a threshold, the system may determine that there is a profile match (720, Yes). The system may then initiate a profile switch (725).

In some implementations, initiating the profile switch is automatic. In other words, the system may sign the current user out and sign the other user on, which results in use of different user profile data. Automatic profile switching may be an option expressly selected by the users of the mobile device. In some implementations, initiating the profile switch may include providing a prompt requesting permission to switch user profiles. For example, the system may provide a window asking whether the device should switch profiles and inform the user which profile will be selected. In some implementations, initiating a profile switch may sign the current user off and take the device to a sign-in interface, where the user is required to select a profile and enter a password, for example. In some implementations, the system may select a default profile (e.g., the one with the highest confidence score) and prompt for the password. In other words, the system may automatically log out of the current profile, which requires the user to expressly sign back in with another profile. Initiating a profile switch may end process 700. After a successful switch (e.g., the user successfully signs in), the system may enter a training phase (e.g., step 705) or may continue at step 710 comparing current activity against the new user profile.

If the current activity does not match another profile (720, No), the system may present a challenge to the user (730), as explained above with regard to step 320 of FIG. 3. The challenge may be based on previously accessed content that was consistent (e.g. met or exceeded the confidence threshold) with either the profile of the currently logged in user or with a profile that had the highest confidence score from step 710. For example, in a multi-user environment, each user may have an individual screen capture index, session features, profile data, etc. Thus, the device can select information from the session features, such as session features 132 of FIG. 1, or the screen capture index, such as index 146 of FIG. 1, associated with the signed-in user to formulate the challenge as discussed above. The system may also use the session features and/or screen capture index associated with a profile that received the highest confidence level rather than the signed in user. The system may select the profile with the highest confidence level when the confidence score for the profile approaches the threshold, but is not high enough to meet the threshold. Thus, the challenge may be tailored to the most likely user rather than the signed in user. As indicated above, the challenge may be a series of sub-challenges and can be based on content recognized in a previously viewed screen. In some implementations, rather than presenting a challenge, the system may log the current user off.

If a challenge is presented and met (735, Yes), the system may use the feature vectors generated for the session as a positive training example (740). If the challenge was based on content associated with the currently signed in user, the examples may be associated with the currently signed in user. If the challenge is based on content associated with another user, the examples may be associated with the other user, and the device may initiate a profile switch, as described above. The new training examples may be used to train/refine the classification model. Process 700 then continues in the inference mode for the currently signed in user.

If the challenge is not met (735, No), the system may determine whether to issue another challenge (745). As described above with regard to FIG. 3, this may be dependent on the implantation and whether the challenge includes sub-challenges and whether the user has successfully met any previous sub-challenges. If there are no other challenges to be met (745, No), the system may lock the mobile device (750) as described above with regard to step 340 of FIG. 3.

FIG. 8 shows an example of a generic computer device 800, which may be operated as server 170, and/or device 110 of FIG. 1, which may be used with the techniques described here. Computing device 800 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computing device, such as a laptop computer 832, personal computer 834, or tablet/smart phone 836. An entire system may be made up of multiple computing devices 800 communicating with each other. Other configurations are possible.

FIG. 9 shows an example of a generic computer device 900, which may be server 170 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980*a* includes multiple racks 958*a*-958*n*. Each rack may include one or more processors, such as processors 952*a*-952*n* and 962*a*-962*n*. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952*a*-952*n*. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980*a* may communicate with devices 980*b*, 980*c*, and 980*d*, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

According to certain aspects of the disclosure, a mobile device includes at least one processor and memory storing instructions that, when executed by the at least one processor, cause the mobile device to perform operations. The operations include identifying content rendered by a mobile application, the content being rendered during a session, generating feature vectors from the content and determining that the feature vectors do not match a classification model. The operations also include providing, in response to the determination that the feature vectors do not match the classification model, a challenge configured to authenticate a user of the mobile device.

This and other aspects can include one or more of the following features. For example, the session may be a first session and the challenge is based on a previous session distinct from the first session. In such an implementation, the previous session may include feature vectors that matched the classification model or feature vectors verified using a trusted location or feature vectors verified by a previous challenge. As another example, the challenge may be configured to prompt the user to complete information missing from a screen displayed by the mobile device in a previous session that included feature vectors that matched the classification model. As another example, providing the challenge can include extracting information from a screen displayed by the mobile device in a previous session that included feature vectors matching the classification model and generating a multiple choice question based on the extracted information.

As another example, the memory may further store instructions that, when executed by the at least one processor, cause the mobile device to receive a response to the challenge and lock the mobile device when the response fails the challenge. As another example, the challenge may include a series of sub-challenges. As another example, the classification model is trained by sessions occurring at a trusted location. A session may include a single screen captured on the mobile device, screens captured during usage of a particular user interface in the mobile application, screens captured during a window of time, or screens captured during use of the mobile application.

According to certain aspects of the disclosure a method may comprise determining that a mobile device is located at a trusted location, capturing information from a session, the information coming from content rendered by a mobile application running on the mobile device during the session, and generating feature vectors for the session. The method also includes repeating the capturing and determining until a training criteria is met and authenticating a user of the mobile device using the trained classification model.

This and other aspects can include one or more of the following features. For example, the training criteria can include a minimum quantity of sessions or a minimum classification accuracy. As another example, authenticating the user using the trained classification model may include determining a current session based on content rendered by a mobile application, generating feature vectors for the session, and providing, in response to determining that the feature vectors do not match the classification model, a challenge configured to authenticate a user of the mobile device. In some such implementations, the feature vectors may not match the classification model when a confidence score generated by evaluating the feature vectors with the classification model fails to meet a threshold. As another example, determining the mobile device is located at a trusted location may include accessing a user profile associated with the mobile device to determine a trusted location and determining that the mobile device is currently located at the trusted location. In some such implementations, the trusted location may be represented by global positioning system (GPS) coordinates and the mobile device uses current GPS coordinates to determine whether the mobile device is current at the trusted location or the trusted location is represented by a wireless network identifier and the mobile device determines whether a wireless network the mobile device is connected to matches the wireless network identifier.

According to certain aspects of the disclosure, a mobile device comprises at least one processor and memory storing instructions that, when executed by the at least one processor, cause the mobile device to perform operations. The operations may include identifying content rendered by a mobile application, the content being rendered during a session, and generating feature vectors from the content. The operations may also include applying a classification model to the feature vectors, determining whether the feature vectors match a first user profile based on application of the classification model, the first user profile differing from a second user profile, the mobile device being currently associated with the second user profile, and initiating a profile switch responsive to determining that the feature vectors match the first user profile.

This and other aspects can include one or more of the following features. For example, the operations may also include determining that the feature vectors match no user profiles and providing a challenge a challenge configured to authenticate a user of the mobile device. As another example, the challenge may be based on second content rendered during a previous session associated with the second user profile, the second content being associated with feature vectors consistent with the second user profile according to the classification model. As another example, the challenge is based on second content rendered during a previous session associated with the first user profile when the classification model determines the first user profile has a higher confidence score than the second user profile with regard to the feature vectors. As another example, determining whether the feature vectors match the first user profile occurs after determining that the feature vectors fail to match the second user profile.

As another example, the operations may also include training the classification model by determining that a mobile device is located in a trusted environment associated with the second user profile, recognizing content rendered by a mobile application running on the mobile device, the content being associated with a session generating feature vectors for the content, repeating the recognizing and generating for at least a minimum quantity of sessions, and training the classification model using the feature vectors as positive examples, the positive examples being associated with the second user profile. In some such implementations, positive examples associated with the first user profile are used as negative examples for the second user profile in training the classification model. The operations may also include training the classification model until a minimum classification accuracy is reached.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
at least one processor; and
memory storing instructions that, when executed by the at least one processor, cause the mobile device to:
identify content rendered by a mobile application, the content being rendered by one or more screen capture events occurring during a session,
generate feature vectors from the content,
determine that the feature vectors do not match a classification model, and
provide, in response to the determination that the feature vectors do not match the classification model, a challenge using content captured from a prior screen capture event, the challenge being configured to authenticate a user of the mobile device;
wherein providing the challenge using the content captured from the prior screen capture event is based on the prior screen capture event occurring during a previous session that included previous session feature vectors that matched the classification model or that were verified using a trusted location, and wherein the previous session is distinct from the session.

2. The mobile device of claim 1, wherein providing the challenge using the content captured from the prior screen capture event is based on the prior screen capture event occurring during the previous session that included previous session feature vectors that matched the classification model.

3. The mobile device of claim 1, wherein providing the challenge using the content captured from the prior screen capture event is based on the prior screen capture event occurring during the previous session that included previous session feature vectors verified using the trusted location.

4. The mobile device of claim 1, wherein the challenge is configured to prompt the user to complete information missing from the screen capture event that occurred in the previous session.

5. The mobile device of claim 1, wherein providing the challenge includes:
extracting information from the prior screen capture event that occurred in a previous session that included feature vectors matching the classification model; and
generating a multiple choice question that uses the extracted information.

6. The mobile device of claim 1, wherein the memory further stores instructions that, when executed by the at least one processor, cause the mobile device to:
receive a response to the challenge; and
lock the mobile device when the response fails the challenge.

7. The mobile device of claim 1, wherein the challenge includes a series of sub-challenges.

8. A method comprising:
determining that a mobile device is located at a trusted location;

capturing information from a session occurring at the trusted location, the information coming from content obtained from one or more screen capture events occurring during the session;

generating feature vectors for the session based on the information captured from the session, wherein generating the feature vectors based on the information is based on the session occurring at the trusted location;

repeating the capturing and determining until a training criteria is met;

training a classification model using at least some of the feature vectors as positive examples; and authenticating a user of the mobile device using the trained classification model.

9. The method of claim 8, wherein the training criteria includes a minimum quantity of sessions or a minimum classification accuracy.

10. The method of claim 8, wherein authenticating the user using the trained classification model includes:

determining a current session based on content rendered by a mobile application;

generating feature vectors for the session; and providing, in response to determining that the feature vectors do not match the classification model, a challenge configured to authenticate a user of the mobile device.

11. The method of claim 8, wherein determining the mobile device is located at a trusted location includes:

accessing a user profile associated with the mobile device to determine a trusted location; and determining that the mobile device is currently located at the trusted location.

12. The method of claim 11, wherein the trusted location is represented by global positioning system (GPS) coordinates and the mobile device uses current GPS coordinates to determine whether the mobile device is current at the trusted location.

13. The method of claim 11, wherein the trusted location is represented by a wireless network identifier and the mobile device determines whether a wireless network the mobile device is connected to matches the wireless network identifier.

14. A mobile device comprising:

at least one processor; and memory storing instructions that, when executed by the at least one processor, cause the mobile device to:

identify content rendered by a mobile application, the content being rendered by one or more screen capture events occurring during a session, generate feature vectors from the content, apply a classification model to the feature vectors, determine whether the feature vectors match a first user profile based on application of the classification model, the first user profile differing from a second user profile, the mobile device being currently associated with the second user profile, initiate a profile switch responsive to determining that the feature vectors match the first user profile; and provide, responsive to determining that the feature vectors match no user profiles, a challenge using content captured from a prior screen capture event, the challenge being configured to authenticate a user of the mobile device;

wherein the memory further stores instructions that, when executed by the at least one processor, cause the mobile device to train the classification model by:

determining that the mobile device is located in a trusted environment associated with the second user profile;

recognizing additional content rendered by the mobile application, or an additional mobile application, running on the mobile device, the additional content being associated with an additional session;

generating additional feature vectors for the additional content;

repeating the recognizing and generating for at least a minimum quantity of sessions; and training the classification model using the feature vectors as positive examples, the positive examples being associated with the second user profile.

15. The mobile device of claim 14, the session being a first session and the prior screen capture event occurred during a previous session distinct from the first session, the previous session including feature vectors that matched the classification model.

16. The mobile device of claim 15, wherein the previous session is associated with the second user profile, the previous session being associated with feature vectors consistent with the second user profile according to the classification model.

17. The mobile device of claim 15, wherein the previous session is associated with the first user profile when the classification model determines the first user profile has a higher confidence score than the second user profile with regard to the feature vectors.

18. The mobile device of claim 14, wherein positive examples associated with the first user profile are used as negative examples for the second user profile in training the classification model.

* * * * *